Patented Sept. 30, 1924.

1,509,846

UNITED STATES PATENT OFFICE.

JOHN H. SACHS, OF WILMINGTON, DELAWARE, AND VAHAN S. BABASINIAN, OF SOUTH BETHLEHEM, PENNSYLVANIA, ASSIGNORS TO E. I. DU PONT DE NEMOURS & COMPANY, OF WILMINGTON, DELAWARE, A CORPORATION OF DELAWARE.

PRODUCTION OF ANTHRAQUINONE DERIVATIVES.

No Drawing. Application filed September 25, 1920. Serial No. 412,819.

*To all whom it may concern:*

Be it known that we, JOHN H. SACHS and VAHAN S. BABASINIAN, citizens of the United States, and residents of Wilmington, county of New Castle, State of Delaware, and South Bethlehem, county of Northampton, State of Pennsylvania, respectively, have invented a certain new and useful Production of Anthraquinone Derivatives, of which the following is a specification.

This invention relates to the oxidation of the product obtainable by fusing beta-amino-anthraquinone with potassium nitrate and hydroxide and treating the resulting anthraquinone derivative with sodium hydrosulphite, and comprises subjecting said product to the action of air or other suitable oxygen-containing gas in the presence of an acid.

The product which is to be oxidized in the manner above outlined has most probably the following graphical formula:—

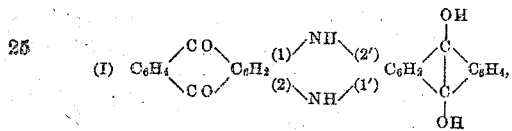

and the product resulting from the oxidation has most probably the formula:

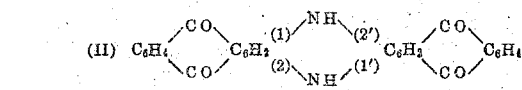

and may be designated: N-dihydro-1,2,1',2'-anthraquinone-azine.

In carrying out our new process the product to be oxidized, preferably in the form of its sodium salt, may be suspended in a dilute solution of a mineral acid, such for example as hydrochloric, nitric, or sulphuric acid, and air blown into the mixture while maintaining the latter at a temperature of from about 60 to 90° C. until the oxidation is completed.

Our process may be illustrated more in detail by the following example: 10 pounds of the sodium salt of the leuco derivative of N-dihydro-1,2-1',2'-anthraquinone-azine (said leuco derivative being the same as the reduced form of product "A" described in Patent 724,789) are suspended in about 500 pounds of a 6% solution of sulphuric acid, and the mixture then brought to a temperature of about 70° C. Air is then blown into the liquid, while maintaining the latter at about 70° C. for about one hour or until the oxidation is completed. The suspension is then filtered and the press cake, composed chiefly of N-dihydro-1,2-1',2'-anthraquinone-azine, is washed with water until free from acid.

The strength of acid used may vary considerably, although we prefer an acid of from 5 to 10% strength. The amount of sulphuric acid solution for 10 pounds of the sodium salt may be more or less than 500 pounds, an amount between 400 and 1000 pounds being preferred. We may, for instance, suspend 10 pounds of the sodium salt in from 600 to 1400 pounds of 7% hydrochloric acid, the treatment with air being carried out while the solution is at a temperature of 70–80° C.

The advantages of this method of oxidation over oxidation in alkaline or neutral solution are as follows:—

(1) During the fusion, iron and other impurities are introduced into the melt. These are removed by the oxidation in acid solution, being soluble in this medium.

(2) The filtration of the product which results on oxidation in neutral or alkaline solution is very difficult, whereas the filtration is very easy when the oxidation is carried out in dilute acid.

(3) The oxidation time in neutral or alkaline solution is five to six hours, whereas in dilute acid the time is less than one hour.

The N-dihydro-1,2-1',2'-anthraquinone-azine obtained in the above described manner is an intermediate in the manufacture of dyes of the anthraquinone series.

Our new process of oxidation in an acid medium may also be employed to produce the homologs and N-alkyl derivatives of the above named azine from their corresponding leuco derivatives all of which contain the following atomic grouping:

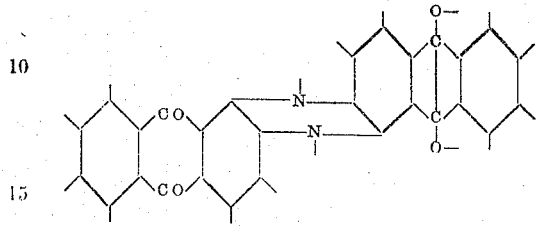

We claim:—

1. The process of producing an anthraquinone derivative which comprises oxidizing in the presence of an acid the leuco derivative of a product obtainable by fusing beta-amino-anthraquinone with potassium hydroxide and potassium nitrate.

2. The process of producing an anthraquinone derivative which comprises passing air into an acid solution containing in suspension the leuco derivative of a product obtainable by fusing beta-amino-anthraquinone with potassium hydroxide and potassium nitrate.

3. The process of producing an anthraquinone derivative which comprises passing air into a dilute solution of a mineral acid containing in suspension the leuco derivative of a product obtainable by fusing beta-amino-anthraquinone with potassium hydroxide and potassium nitrate.

4. The process of producing an anthraquinone derivative which comprises passing air into a dilute solution of sulphuric acid maintained at a temperature between 60 and and 90° C. and containing in suspension the leuco derivative of a product obtainable by fusing beta-amino-anthraquinone with potassium hydroxide and potassium nitrate.

5. The process of producing an anthraquinone derivative which comprises oxidizing in the presence of an acid a substance whose molecule contains the following atomic grouping:

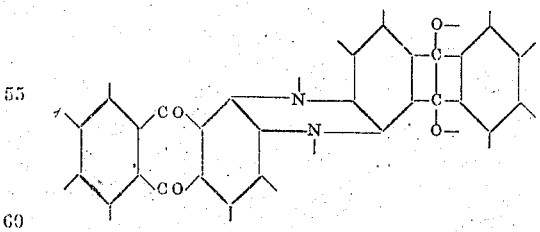

6. The process of producing an anthraquinone derivative which comprises passing air into a dilute solution of a mineral acid maintained at a temperature between 60 and 90° C. and containing in suspension a substance whose molecule contains the following atomic grouping:

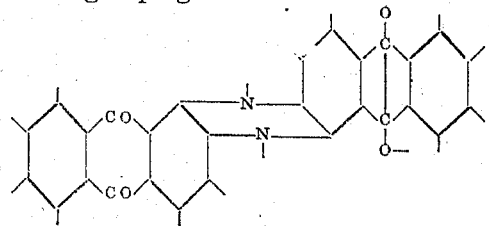

7. The process of producing an anthraquinone derivative which comprises passing air into a mineral acid solution of from about 5 to 10% strength maintained at a temperature of between 60 and 90° C. and containing a substance whose molecule contains the following atomic grouping:

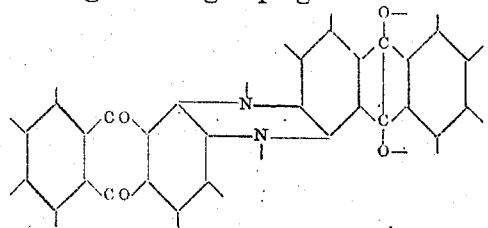

8. The process of producing N-dihydro-1,2,1',2'-anthraquinone-azine which comprises suspending 10 parts of the leuco derivative of said azine in from about 400 to 1000 parts of sulphuric acid of about 6% strength, and passing air into the resulting suspension, while maintaining it at a temperature of about 70° C., until oxidation of the leuco compound is substantially completed.

9. The process of producing an anthraquinone derivative which comprises suspending the sodium salt of the leuco derivative of N-dihydro-1,2,1',2'-anthraquinone-azine in a dilute solution of a strong mineral acid, and subjecting the suspended leuco derivative to oxidation.

10. The process of producing an anthraquinone derivative which comprises suspending the sodium salt of the leuco derivative of N-dihydro-1,2,1',2'-anthraquinone-azine in a dilute solution of a strong mineral acid, and passing air through the resulting suspension until oxidation of the leuco derivative has occurred to the desired extent.

11. The process of producing an anthraquinone derivative which comprises suspending 10 parts of the sodium salt of the leuco derivative of N-dihydro-1,2,1',2'-anthraquinone-azine in from about 400 to 1000 parts of a dilute solution of sulphuric acid preferably of from 5 to 10% strength, and subjecting the suspended leuco derivative to oxidation.

In testimony whereof we affix our signatures.

JOHN H. SACHS.
VAHAN S. BABASINIAN.